United States Patent
Esjunin

(10) Patent No.: US 10,704,836 B2
(45) Date of Patent: Jul. 7, 2020

(54) REFRACTORY ARTICLE AND METHOD OF FORMING

(71) Applicant: SAINT-GOBAIN CERAMICS & PLASTICS, INC., Worcester, MA (US)

(72) Inventor: Evgeniy E. Esjunin, Dunstable, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 223 days.

(21) Appl. No.: 15/877,480

(22) Filed: Jan. 23, 2018

(65) Prior Publication Data

US 2018/0216889 A1 Aug. 2, 2018

Related U.S. Application Data

(60) Provisional application No. 62/450,013, filed on Jan. 24, 2017.

(51) Int. Cl.
*F27D 1/14* (2006.01)
*C04B 37/02* (2006.01)
(Continued)

(52) U.S. Cl.
CPC ............ *F27D 1/148* (2013.01); *C04B 37/003* (2013.01); *C04B 37/005* (2013.01); *C04B 37/023* (2013.01); *C04B 37/025* (2013.01); *F27B 17/0041* (2013.01); *F27D 1/142* (2013.01); *C04B 2237/064* (2013.01);
(Continued)

(58) Field of Classification Search
CPC ...................................................... F27D 1/148
See application file for complete search history.

(56) References Cited

U.S. PATENT DOCUMENTS 1,739,037 A * 12/1929 Louthan ................ F27D 5/0025
432/259
2,871,543 A * 2/1959 Easter ................... F27D 5/0006
432/258
(Continued)

FOREIGN PATENT DOCUMENTS

JP    2008308978 A    12/2008
WO    2009121050 A2    10/2009

OTHER PUBLICATIONS

International Search Report and Written Opinion for PCT/US2018/014769, dated Apr. 25, 2018, 15 pages.

*Primary Examiner* — Nathaniel Herzfeld
(74) *Attorney, Agent, or Firm* — Abel Schillinger, LLP; Adrian Lawrence

(57) ABSTRACT

A refractory article can include a socket including a cavity that is configured to receive a post, a particulate material, and a binder. The binder is configured to bond the post to the socket. The refractory article can include a sleeve coupled to the socket and configured to bond the post to the socket. In an embodiment, the sleeve can bond to the binder. In another embodiment, a collar can be placed between the sleeve and the binder. The collar can be configured to bond the post to the socket. A method of forming a refractory article can include disposing a particulate material within a cavity of a socket and placing a binder material overlying the particulate material.

20 Claims, 6 Drawing Sheets

(51) Int. Cl.
*C04B 37/00* (2006.01)
*F27B 17/00* (2006.01)

(52) U.S. Cl.
CPC .. *C04B 2237/343* (2013.01); *C04B 2237/365* (2013.01); *C04B 2237/406* (2013.01); *C04B 2237/592* (2013.01); *C04B 2237/595* (2013.01); *C04B 2237/84* (2013.01)

(56) References Cited

U.S. PATENT DOCUMENTS

| | | | | |
|---|---|---|---|---|
| 3,160,480 A | * | 12/1964 | Alliegro | C04B 37/026 |
| | | | | 428/627 |
| 4,141,681 A | * | 2/1979 | Lovatt | F27D 5/0006 |
| | | | | 432/258 |
| 4,184,841 A | * | 1/1980 | Robinson | F27D 5/0025 |
| | | | | 432/258 |
| 4,330,267 A | * | 5/1982 | Wood | F27D 3/123 |
| | | | | 432/137 |
| 4,424,022 A | * | 1/1984 | Herrold | F27D 5/00 |
| | | | | 432/5 |
| 4,462,798 A | * | 7/1984 | Foster | F27D 5/0006 |
| | | | | 432/241 |
| 4,770,631 A | * | 9/1988 | Hell | F27D 5/005 |
| | | | | 432/249 |
| 5,112,223 A | * | 5/1992 | Walle | F27D 3/123 |
| | | | | 432/137 |
| 2011/0024956 A1 | | 2/2011 | Jorge et al. | |

\* cited by examiner

_US 10,704,836 B2_

REFRACTORY ARTICLE AND METHOD OF FORMING

CROSS-REFERENCE TO RELATED APPLICATION(S)

This application claims priority under 35 U.S.C. § 119(e) to U.S. Patent Application No. 62/450,013, filed on Jan. 24, 2017, entitled "REFRACTORY ARTICLE AND METHOD OF FORMING," by Evgeniy E. Esjunin, which is assigned to the current assignee hereof and is incorporated herein by reference in its entirety.

FIELD OF THE DISCLOSURE

The present disclosure relates to a refractory article and methods of forming the same.

RELATED ART

Kiln furniture is a structural member that can be used to transport a green body to and properly maintain the green body in a desired position during heating processes. Posts can be components of kiln furniture, and sockets are often used to receive the posts. Repair is needed when posts become wobbly or worn out and may be time consuming and labor intensive, which would cause extended downtime of kiln furniture. The industry continues to demand improvements in kiln furniture.

BRIEF DESCRIPTION OF THE DRAWINGS

Embodiments are illustrated by way of example and are not limited in the accompanying figures. The drawings are not necessary to scale.

The use of the same reference symbols in different drawings indicates similar or identical items.

DETAILED DESCRIPTION

Figure 1:
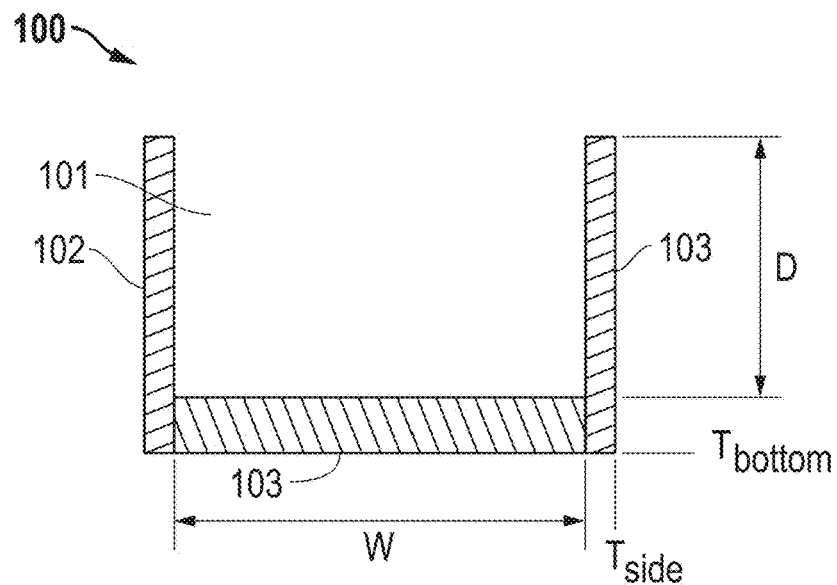
FIG. 1 includes an illustration of a cross-sectional view of a socket in accordance with an embodiment.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

As used herein, the term "consisting essentially of" is intended to mean an object or a part of the refractory article may include an impurity in addition to the material or composition following the term. Unless otherwise indicated, the impurity can be in a total content that is generally included in the material or composition, as known in the art. For instance, the castable disclosed herein may include a total content of impurity of not greater than 10 wt. % of the total weight of the castable.

Unless otherwise defined, all other technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the refractory arts.

The concepts are better understood in view of the embodiments described below that illustrate and do not limit the scope of the present invention. The following description is directed to a refractory article, and particularly, to an article including components that are suitable for applications at high temperatures, such as on the order of 1,000° C. and higher. For instance, the refractory article can be used in kiln furniture. According to an embodiment, the refractory article can include a socket configured to receive a post, which can be a supporting member in kiln furniture, and a particulate material and a binder material to provide improved stability and rigidity to the post. The refractory article can allow easy replacement of old posts and improve utilization efficiency of kiln furniture.

According to an embodiment, a refractory article can include a socket. Referring to FIG. 1, a cross-sectional view of an exemplary socket 100 is illustrated. The socket 100 can include a cavity 101, a side wall 102, and a bottom wall 103. According to an embodiment, the cavity 101 can be configured to receive a post.

As illustrated in FIG. 1, the socket 100 can include a depth D. The depth D can vary to suit different applications of the refractory article. In an embodiment, the depth D can be at least 5 cm, such as at least 8 cm, 10 cm, or at least 15 cm. In another embodiment, the depth D can be at most 50 cm, such as at most 40 cm, at most 30 cm, or at most 25 cm. The depth D can be within a range including any of the minimum and maximum values disclosed herein, such as within a range including at least 5 cm and at most 50 cm.

According to another embodiment, the cavity 101 can include a width W as illustrated in FIG. 1. The width W can vary to receive posts of different sizes. For instance, the cavity can have a width of at least 3 cm, such as at least 4 cm, at least 5 cm, at least 7 cm, or at least 9 cm. In another instance, the cavity can have width of at most 30 cm, such as at most 25 cm, or at most 18 cm. The width W can be within a range including any of the minimum and maximum values disclosed herein, such as within a range including at least 3 cm and at most 30 cm. In a particular embodiment, the width W can be at most the depth D. In another particular embodiment, the width W can be at least ½ of D. For instance, the width W can be at least ½ of the depth D and at most the same as the depth D.

According to an embodiment, the side wall 102 can include a refractive material. For instance, the side wall can include metal, SiC, or the like. Metal can include an alloy, particularly an alloy including iron, such as high temperature steel.

According to a further embodiment, the side wall 102 can have a certain thickness $T_{side}$, as illustrated in FIG. 1. The thickness $T_{side}$ can be at least 0.4 cm, such as at least 0.6 cm or at least 0.8 cm. In another embodiment, the thickness of $T_{side}$ can be at most 2.5 cm, such as at most 2.3 cm or at most 2.1 cm. The thickness of the side wall can be within a range including any of the minimum and maximum values noted herein, such as within a range from at least 0.4 cm to at most 2.5 cm or within a range from at least 0.6 cm to at most 2.1 cm. According to another embodiment, the thickness of the side wall $T_{side}$ may be at least 1/20 of the depth D of the socket and at most ¼ of the depth D.

According to an embodiment, the bottom wall 103 can include a material that can serve as a thermal barrier and provide vertical support to a post and/or other component as needed by kiln furniture. An exemplary material can include alumina, cordierite ($(Mg,Fe)_2Al_4Si_5O_{18}$), mullite, castable, cement, fiber, or the like, or any combination thereof. According to a particular embodiment, the bottom wall can consist essentially of alumina. A particular example of alumina can include cast alumina, pressed alumina, dense alumina, or any combination thereof.

According to a further embodiment, the bottom wall 103 can have a certain thickness, $T_{bottom}$, as illustrated in FIG. 1. In some applications, $T_{bottom}$ can be similar to $T_{side}$. In another instance, $T_{bottom}$ can be at least 0.3 cm, such as at least 0.4 cm or at least 0.7 cm. In still another embodiment, $T_{bottom}$ can be at most 2.5 cm, such as at most 2.3 cm or at most 2.1 cm. In a further embodiment, $T_{bottom}$ can be within a range including any of the minimum and maximum values noted herein, such as within a range from at least 0.3 cm to at most 2.5 cm or within a range from at least 0.4 cm to at most 2.1 mm. According to another embodiment, the thickness of the side wall $T_{bottom}$ may be at least 1/20 of the depth D of the socket and at most ¼ of the depth D. In a particular embodiment, the bottom wall of the socket can be part of the floor of a kiln car where the socket is installed.

According to an embodiment, the socket 100 can have any shape as desired by kiln furniture. For instance, the socket can have a shape including cylinder, cube, cone, pyramid, rectangular prism, or the like. According to another embodiment, the cavity can have a shape of cylinder, cube, rectangular prism, or an irregular shape, to conform to the shape of a post.

Figure 2:
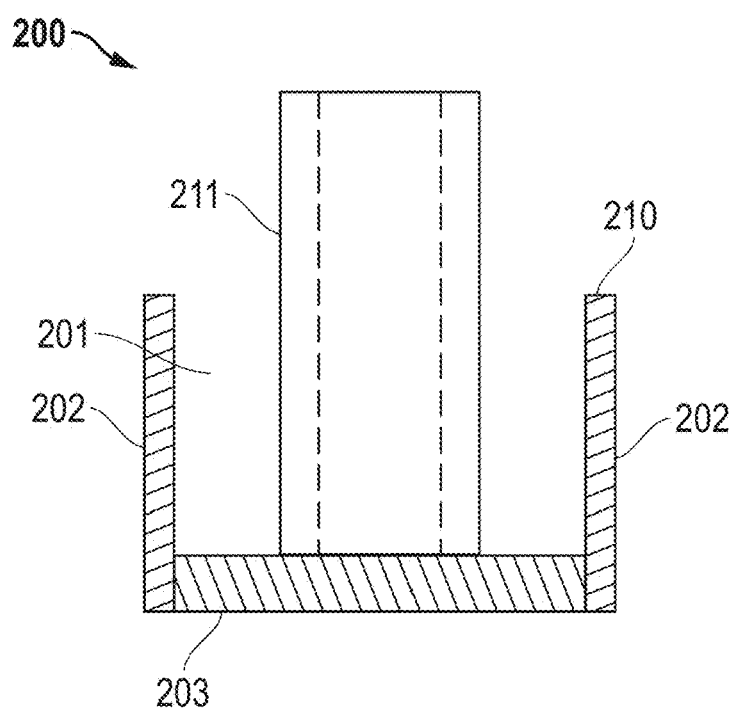
FIG. 2 includes an illustration of a cross-sectional view of a refractory article in accordance with an embodiment.

FIG. 2 includes an illustration of a refractory article 200. As illustrated, a post 211 can be placed in a cavity 201 of a socket 210. The socket 210 can be similar to any socket disclosed herein, including a side wall 202 and bottom wall 203. The bottom wall 203 can be configured to support the post 211. The post 211 may be placed in the center of the cavity 201 as illustrated. As desired by certain applications, a post may be placed sideways such that more space can be left to a side of the post than another within the cavity. The post 211 can be hollow or solid. According to an embodiment, the post can include a refractory material, such as SiC, alumina, cordierite, or the like, or any combination thereof.

Figure 3:
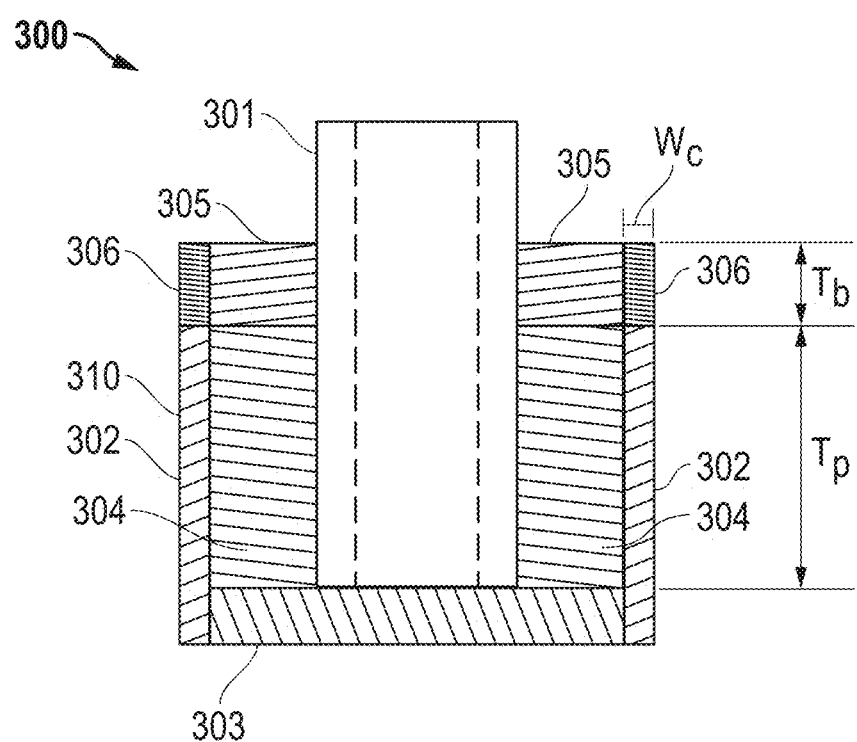
FIG. 3 includes an illustration of a cross-sectional view of a refractory article in accordance with another embodiment.

According to an embodiment, the refractory article can include a particulate material. The particulate material can be contained within the cavity of the socket. FIG. 3 includes an illustration of a cross-sectional view of an exemplary refractory article 300. The refractor article 300 includes a socket 310 including a cavity 301, a side wall 302, and a bottom wall 303. The socket 310 can be similar to any socket disclosed herein. The cavity 301 can be configured to receive a post 311. A particulate material 304 is disposed within the cavity 301 and takes up substantially all the remaining space of the cavity 301. The particulate material 304 can have a thickness $T_p$ as illustrated in FIG. 3, which can be substantially the same as the depth D of the cavity 301. The particulate material 304 can be placed in direct contact with and surrounding the post 311, and particularly, can be configured to support and stabilize the post 311.

According to an embodiment, the particulate material can include a refractory material. For instance, the particulate material can include at least one of a ceramic, glass, polymer, metal, metal alloy, or any combination thereof. According to a further embodiment, the particulate material can include an oxide, carbide, nitride, oxycarbide, oxynitride, or any combination thereof. For example, the particulate material can include a silicon carbide, alumina grains, mullite grains, or any combination thereof. In a particular embodiment, the particulate material can include silicon carbide, and more particularly, the particulate material can consist essentially of silicon carbide. An exemplary silicon carbide can include a nitride bonded silicon carbide, silicon infiltrated silicon carbide, reaction-bonded silicon carbide, recrystallized silicon carbide, sintered silicon carbide, or any combination thereof. According to another particular embodiment, the particulate material can consist essentially of any of the silicon carbide noted herein. For example, the particulate material can consist essentially of nitride bonded silicon carbide. In another instance, the particulate material can consist essentially of silicon infiltrated silicon carbide.

According to a further embodiment, the refractory article can include a binder disposed above the particulate material and configured to bond to a post. Particularly, the binder can be configured to bond a post to the socket. Referring to FIG. 3, a binder 305 is positioned directly above the particulate material 304. According to an embodiment, the binder 305 can be configured to bond directly to the post 301. The binder 305 can have a certain thickness $T_b$ that can facilitate improved bonding of the post to the socket. For instance, the binder can have a thickness $T_b$ of at least ⅕ of the depth D of the socket, such as at least ¼ of D, or at least ⅓ of D. In another instance, the binder can have a thickness $T_b$ of at most the same depth D of the cavity, such as at most ¾ of the depth D, or at most ½ of the depth D. In a further embodiment, the thickness $T_b$ can be at least ⅕ of the depth D and at most the same of the depth D. In a further embodiment, the thickness $T_b$ can be at least 1 cm, such as at least 2 cm. In another embodiment, the thickness $T_b$ can be at most 4 cm, such as most 3.5 cm. In a further embodiment, the thickness $T_b$ can be at least 1 cm to at most 5 cm.

According to an embodiment, the binder can include a refractory material, such as alumina. Particularly, the binder can consist essentially of alumina. An exemplary alumina can include fused alumina, dense alumina, cast alumina, pressed alumina, or any combination thereof. In a particular embodiment, the binder can consist essentially of any of the alumina noted herein.

According to an embodiment, the refractory article can optionally include a collar. The collar can be placed to contain the binder, configured to couple a post to the socket, or both. The collar can be positioned above the socket and aligned with the side wall of the socket. Referring to FIG. 3, the refractory article 300 includes a collar 306 overlying the socket 301. The collar 306 can have a width $W_c$. In a particular embodiment, the width $W_c$ can be substantially the same as the side wall thickness $T_{side}$ of the socket, such as within ±5% of $T_{side}$. According to an embodiment, the collar 306 can bond directly to the binder 305 and can be configured to bond the post 301 to the socket 310.

According to an embodiment, the collar 306 can have a thickness $T_c$ that can facilitate improved bonding of the post to the collar and/or the socket. For instance, the thickness $T_c$ can be substantially the same as the thickness of the binder $T_b$, such as within ±5% of $T_b$.

Figure 4:
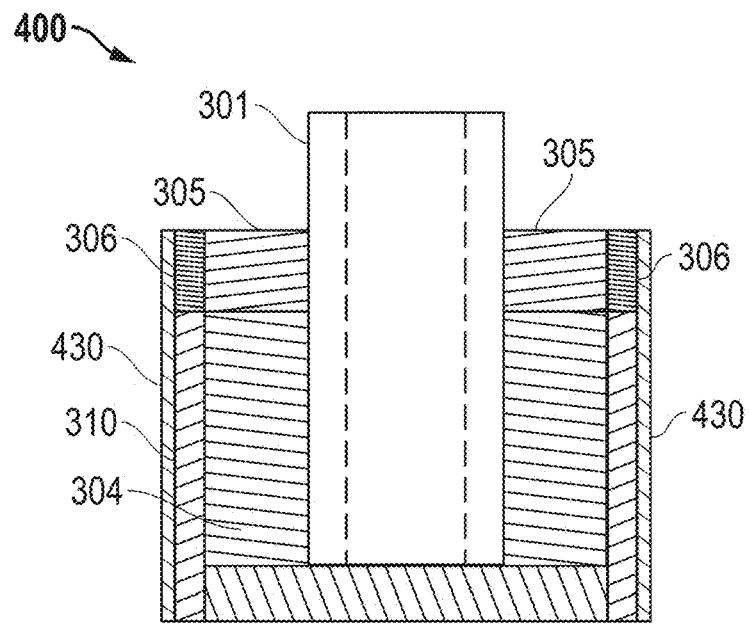
FIG. 4 includes an illustration of a cross-sectional view of a refractory article in accordance with an embodiment.

According to an embodiment, the refractory article can include a sleeve coupled to the socket. The sleeve can be configured to bond a post to the socket. The sleeve may serve as a barrier layer to reduce potential thermal shock to a post during a heating process. According to a further embodiment, the sleeve can be placed spaced apart from the binder, the particulate material, or both. FIG. 4 includes an illustration of a cross-sectional view of a refractory article 400. The refractory article 400 includes a sleeve 430 abutting the socket 310. The sleeve 430 can be fastened (not illustrated) to the socket 310, such as by using screws or nuts and bolts, or other techniques known in the art as desired by an application. The sleeve 430 is separated from the binder 305 by the collar 306. The collar 306 abuts the sleeve 430 and can directly bond to the binder 305. As desired, the sleeve 430 can be fastened to the collar 306, as disclosed herein. According to an embodiment, the collar, sleeve, or both can include a refractory material, such as a metal element, metal alloy, SiC, alumina, or any combination thereof. A particular example of the refractory material can include high temperature steel, superalloy (e.g., Inconel®), a nitride bonded silicon carbide, silicon infiltrated silicon carbide, reaction bonded silicon carbide, recrystallized silicon carbide, sintered silicon carbide, or any combination thereof. In a particular embodiment, the collar, sleeve, or both can include an alloy including iron, such as steel. In another embodiment, the collar, the sleeve, or both can be a multi-piece assembly divided for ease of installation.

Figure 5:
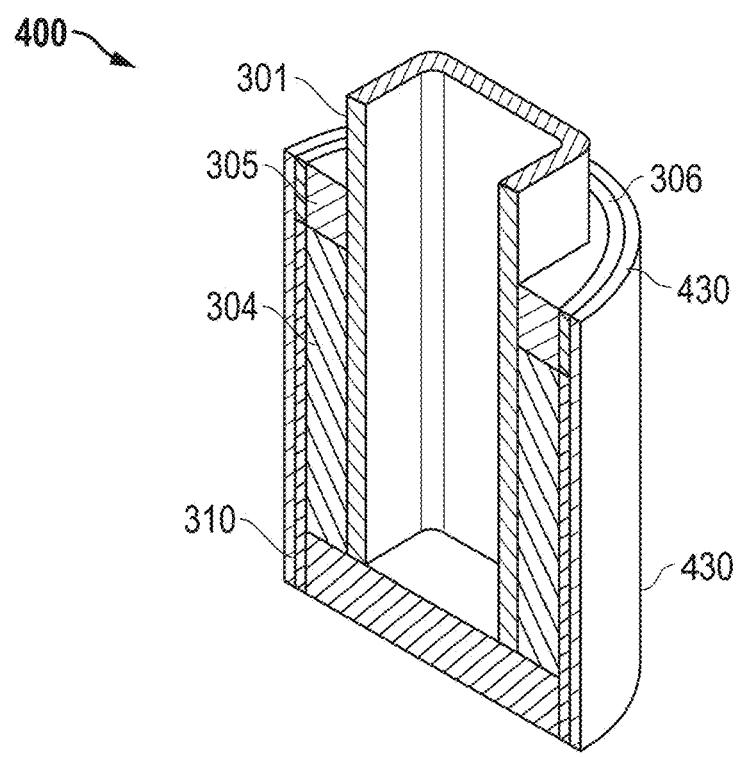
FIG. 5 includes an illustration of a cross-sectional perspective view of the refractory article illustrated in FIG. 4.

FIG. 5 includes an illustration of a cross-sectional perspective view of the refractory article 400. The sleeve 430 and socket 310 have the shape of a cylinder. The post 301 is hollow and has the shape of a rectangular prism. In other applications, the post may have shape of a cylinder, cuboid, or any other shape as desired by the application.

Figure 6:
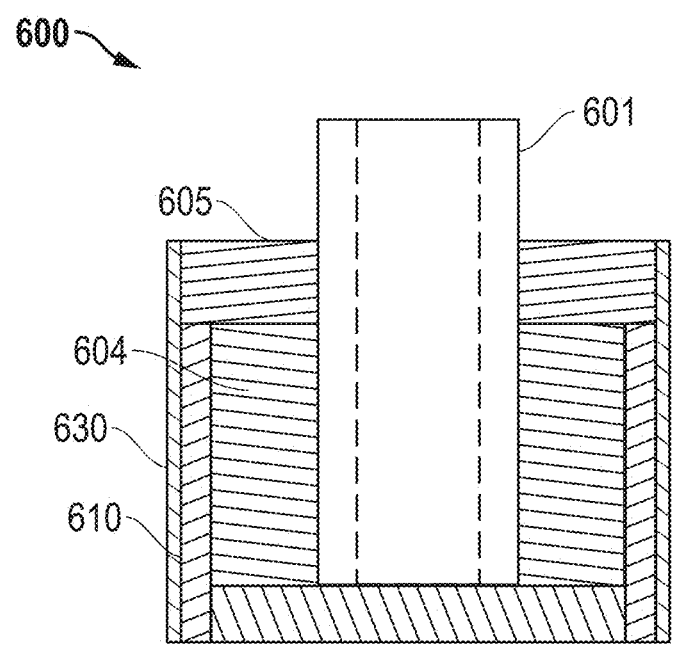
FIG. 6 includes an illustration of a cross-sectional view of a refractory article in accordance with another embodiment.

According to an embodiment, the sleeve can be positioned abutting the binder and the socket. For instance, the sleeve can be directly coupled to the socket and the binder. Particularly, the sleeve can bond directly to the binder. FIG. 6 includes an illustration of a cross-sectional view of a refractory article 600. The refractory article 600 includes a socket 610. A particulate material 604 is contained within the cavity of the socket 610. A sleeve 630 is positioned immediately adjacent to a binder 605 and the socket 610. The sleeve 630 can be configured to bond a post 601 to the socket 610. According to an embodiment, the sleeve 630 can directly bond to the binder 605 and fastened to the socket 610. The socket 610, particulate material 604, and binder 605 can be similar to any other socket, particulate material, and binder disclosed herein, respectively.

According to an embodiment, the refractory article can be formed using a method including disposing a particulate material within a cavity of a socket and placing a binder material overlying the particulate material. In applications the refractory article is used in kiln furniture to receive a post, the particulate material and binder material can be disposed sequentially after the post is placed in the cavity of the socket. The binder material can include a castable material that can form the binder disclosed herein. In accordance with another embodiment, the method can include coupling a sleeve to the socket to facilitate improved bonding of the post to the socket. In a further embodiment, the method can include positioning the sleeve such that the binder material is contained by the sleeve.

In another embodiment, the sleeve can be coupled prior to adding the binder. For instance, the cavity can be filled with the particulate material after the post is placed in the socket, and the sleeve can be positioned to surround and abut the socket, and if desired, be fastened to the socket. After the sleeve is in place, the binder can be disposed within the sleeve overlying the particulate material and the top of the side wall of the socket and take up all the space between the post and the sleeve. In a further embodiment, the binder material can be allowed to dry. While the binder material is drying, the sleeve is bonded to the socket and the post. According to an embodiment, drying of the binder material can be performed at a temperature from 15° C. to 40° C. and for 24 hours to 48 hours. According to a further embodiment, a controlled heating rate may be desired to facilitate further solidification of the binder material when the refractory article is used in a heating application for the first time. For instance, the heating rate can be at most 100° F./hour, such as at most 50° F./hour, until the maximum operation temperature is reached. Cooling can be performed as desired by the application.

According to an embodiment, the sleeve can have a wall thickness and a height. For instance, the wall thickness of the sleeve can be substantially the same as $T_{side}$ of the socket, such as within ±5% of $T_{side}$. In another embodiment, the sleeve can have a wall thickness of at least 0.4 cm, such as at least 0.6 cm, or at least 0.8 cm. In still another embodiment, the sleeve can have a wall thickness of at most 2.5 cm, such as at most 2.2 cm, or at most 2 cm. It is to be understood the sleeve can have a wall thickness including any of the minimum and maximum values disclosed herein, such as within a range of at least 0.4 cm and at most 2.5 cm.

In an embodiment, the sleeve can have a height greater than the depth D of the socket. In another embodiment, the sleeve can have a height that is greater than the thickness of the binder $T_b$ or the thickness of the particulate material $T_p$. In a further embodiment, the sleeve can have a height that is similar to the total of $T_b$ and $T_p$. In another embodiment, the height of the sleeve can be total of the thickness of the binder $T_b$, the thickness of the particulate material $T_p$, and the thickness of the socket bottom wall $T_{bottom}$. In a further embodiment, the height of the sleeve can be at least 10 cm, such as at least 12 cm, at least 14 cm, or at least 15 cm. In another embodiment, the height of the sleeve can be at most 25 cm, such as at most 22 cm, at most 20 cm, or at most 18 cm. It is to be understood that the height of the sleeve can be within a range including any of the minimum and maximum values disclosed herein, such as within a range of at least 10 cm and at most 25 cm.

In another embodiment, the method can include placing a collar between the sleeve and the binder material, such that when the binder material dries, the collar can bond to the binder and the socket. Alternatively, the collar can be placed above the socket prior to placing the binder overlying the particulate material. The sleeve can be coupled to the socket before or after the collar is positioned. For instance, the cavity can be filled with the particulate material after the post is placed in the socket, and the collar can be placed above and abutting the socket surrounding the post. The collar can be aligned with and supported by the side wall of the socket. The binder can then be disposed to fill up the space between the collar and the post, overlying the particulate material. During drying of the binder material, the collar can be bonded to the post. The sleeve can be placed abutting and fastened to the socket. Optionally, the sleeve can be fastened to the collar.

Figure 7:
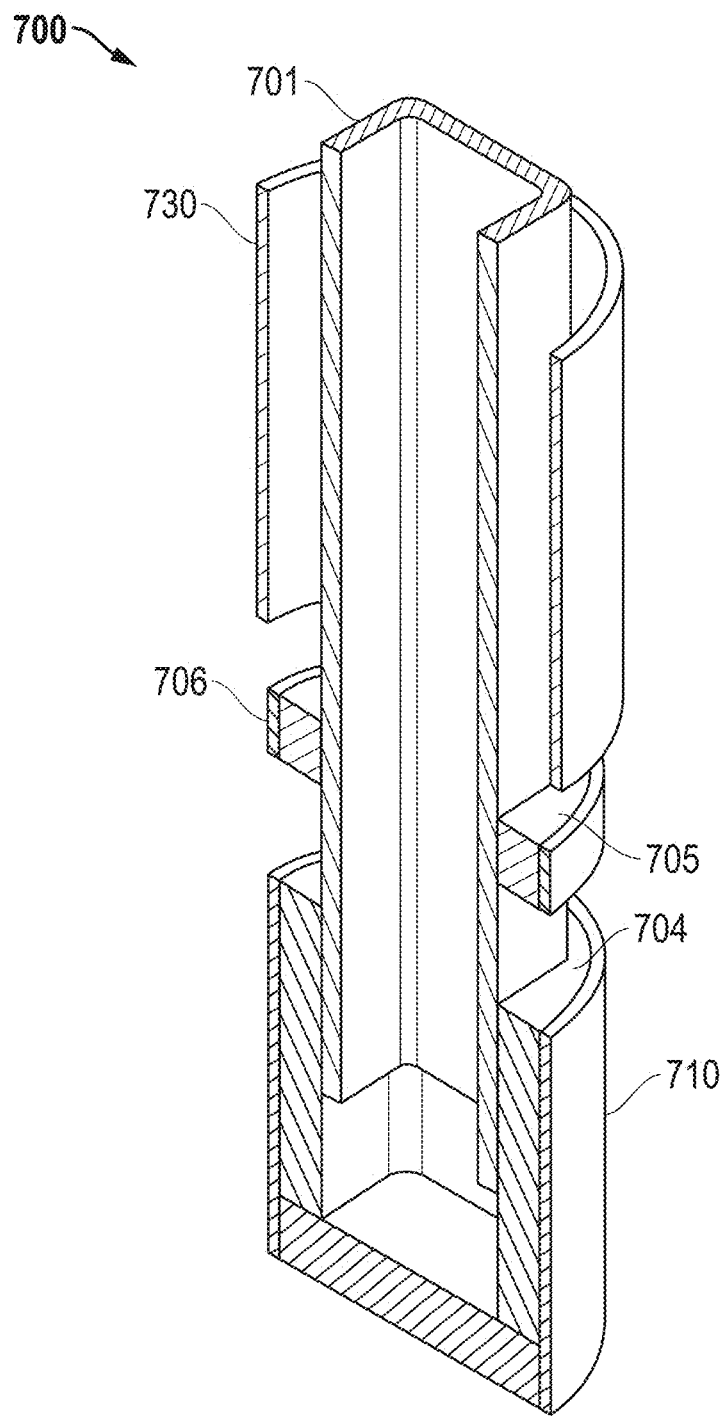
FIG. 7 includes an illustration of a cross-sectional perspective view of a dissembled refractory article in accordance with an embodiment.
Figure 8:
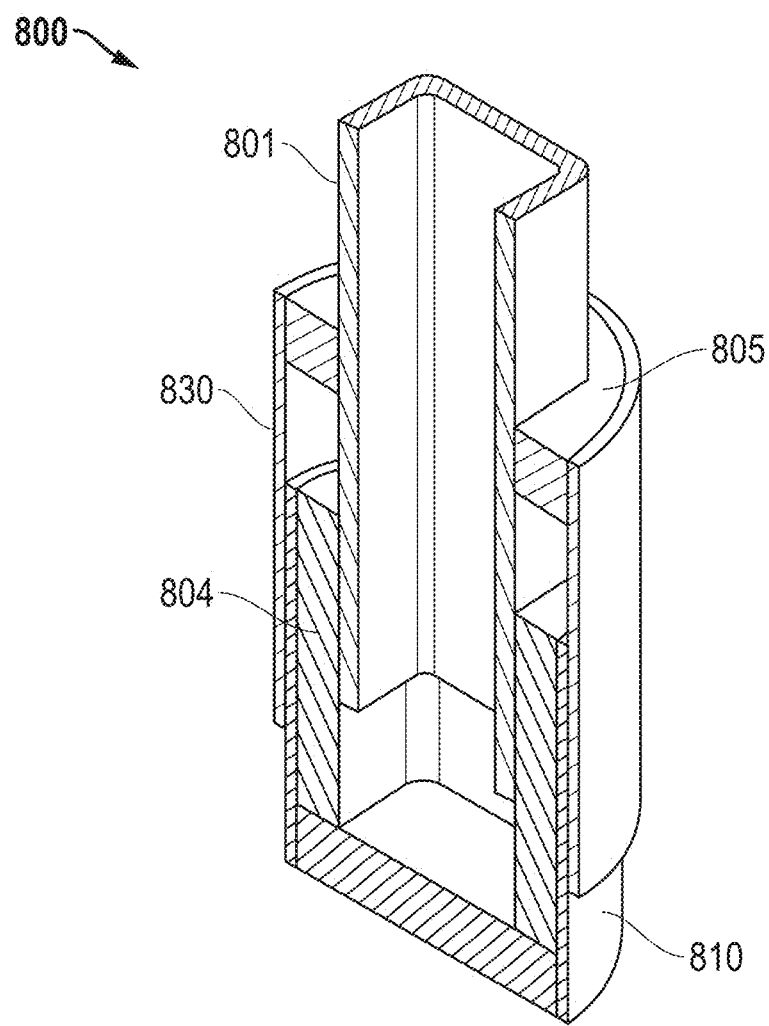
FIG. 8 includes an illustration of a cross-sectional perspective view of a dissembled refractory article in accordance with another embodiment.

The refractory article of embodiments herein can be used in kiln furniture to improve stability and utilization efficiency of the kiln furniture. Conventionally, only grains or cermet are used within sockets to stabilize posts in kiln furniture. However, conventional kiln furniture using only grains can become instable rather quickly, because grains compact after multiple uses of the kiln furniture, causing the posts to tilt or become wobbly. For sockets filled with cermet, extraction of old posts from the sockets can be time consuming and labor intensive, and may cause damages to the sockets, increasing downtime of the kiln furniture. The combination of a particulate material, binder, collar, and sleeve can add rigidity and stability to posts along the vertical direction and prevent posts from tilting due to movement of grains, extending service time of the kiln furniture. The refractory article of embodiments herein can also allow easy extraction and quick replacement of old posts compared to extraction from a cermet filled socket, improving utilization efficiency of the kiln furniture. As illustrated in FIGS. 7 and 8, extraction of posts can be significantly simplified.

FIGS. 7 and 8 include illustrations of dissembled refractory articles 700 and 800 in accordance with embodiments herein. As illustrated in FIG. 7, a post 701 can be easily separated from a particulate material 704 contained in a socket 710, but stay attached to a binder 705 that may be bonded to a collar 706. To facilitate extraction of the post 701, a sleeve 730 can be removed prior to separation of the post 701 from the socket 710. Similarly, in FIG. 8, a post 801 can be easily separated from a particulate material 804 contained in a socket 810. The post 801 can remain bonded to a binder 805 that is attached to a sleeve 830. Fasteners (not illustrated) used to attach the sleeve 830 to the socket 810 may be removed prior to extraction of the post 801. The socket, particulate material, sleeve, collar, and binder illustrated in FIGS. 7 and 8 can be similar to any other socket, particulate material, sleeve, collar, and binder disclosed herein, respectively.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A refractory article, comprising: a socket comprising a cavity configured to receive a post; a particulate material contained within the cavity; and a binder disposed above the particulate material and configured to bond the post to the socket.

Embodiment 2. The refractory article of embodiment 1, further comprising a sleeve coupled to the socket.

Embodiment 3. The refractory article of embodiment 2, wherein the sleeve is abutting the socket and configured to bond the post to the socket.

Embodiment 4. The refractory article of any one of embodiments 1 to 3, wherein the sleeve is fastened to the socket.

Embodiment 5. The refractory article of any one of embodiments 1 to 4, wherein the sleeve is bonded to the binder.

Embodiment 6. The refractory article of any one of embodiments 1 to 4, wherein the sleeve is spaced apart from the binder.

Embodiment 7. The refractory article of any one of embodiments 1 to 4 and 6, further comprising a collar overlying the socket and configured to bond the post to the socket.

Embodiment 8. The refractory article of embodiment 7, wherein the collar is disposed between the binder and the sleeve.

Embodiment 9. The refractory article of any one of embodiments 1 to 8, wherein the socket comprises a bottom wall comprising alumina, cordierite, mullite, castable, cement, fiber, or any combination thereof.

Embodiment 10. The refractory article of any one of embodiments 1 to 9, wherein the bottom wall comprises alumina including fused alumina, cast alumina, pressed alumina, dense alumina, or a combination thereof.

Embodiment 11. The refractory article of any one of embodiments 1 to 10, wherein the socket comprises a bottom wall consisting essentially of alumina.

Embodiment 12. The refractory article of any one of embodiments 1 to 11, wherein the socket comprises a side wall comprising metal, metal alloy, silicon carbide, or a combination thereof.

Embodiment 13. The refractory article of embodiment 12, wherein the side wall comprises an alloy including iron.

Embodiment 14. The refractory article of any one of embodiments 1 to 13, wherein the particulate material comprises at least one of a ceramic, glass, polymer, metal, metal alloy, or a combination thereof.

Embodiment 15. The refractory article of any one of embodiments 1 to 14, wherein the particulate material comprises an oxide, carbide, nitride, oxycarbide, oxynitride, or a combination thereof.

Embodiment 16. The refractory article of any one of embodiments 1 to 15, wherein the particulate material comprises a silicon carbide, alumina grains, mullite grains, or any combination thereof.

Embodiment 17. The refractory article of any one of embodiments 1 to 16, wherein the particulate material comprises a nitride bonded silicon carbide, silicon infiltrated silicon carbide, sintered silicon carbide, recrystallized silicon carbide, reaction bonded silicon carbide or any combination thereof.

Embodiment 18. The refractory article of any one of embodiments 1 to 17, wherein the binder comprises a refractory material.

Embodiment 19. The refractory article of embodiment 18, wherein the refractory material comprises alumina.

Embodiment 20. The refractory article of any one of embodiments 2 to 19, wherein the collar, sleeve, or both comprise metal, metal alloy, silicon carbide, alumina, or a combination thereof.

Embodiment 21. The refractory article of any one of embodiments 2 to 20, wherein the collar, sleeve, or both comprise an alloy including iron.

Embodiment 22. A method forming a refractory article, comprising: disposing a particulate material within a cavity of a socket; and placing a binder material overlying the particulate material.

Embodiment 23. The method of embodiment 22, comprising coupling a sleeve to the socket.

Embodiment 24. The method of embodiments 22 or 23, comprising fastening the sleeve to the socket.

Embodiment 25. The method of any one of embodiments 22 to 24, comprising drying the binder material and bonding the sleeve to the socket.

Embodiment 26. The method of any one of embodiments 22 to 24, comprising placing a collar overlying the socket.

Embodiment 27. The method of embodiment 26, wherein the collar is positioned between the binder material and the sleeve.

Embodiment 28. The method of embodiment 27, comprising drying the binder material and bonding the collar to the socket.

Embodiment 29. The method of any one of embodiments 22 to 28, wherein the binder material comprises a castable material.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A refractory article, comprising:
   a socket comprising a cavity configured to receive a post;
   a particulate material contained within the cavity;
   a binder disposed above the particulate material and configured to bond the post to the socket; and
   a sleeve coupled to the socket.

2. The refractory article of claim 1, wherein the sleeve is abutting the socket and configured to bond the post to the socket.

3. The refractory article of claim 1, wherein the sleeve is fastened to the socket.

4. The refractory article of claim 1, wherein the sleeve is bonded to the binder.

5. The refractory article of claim 1, wherein the sleeve is spaced apart from the binder.

6. The refractory article of claim 1, further comprising a collar overlying the socket and configured to bond the post to the socket.

7. The refractory article of claim 6, wherein the collar is disposed between the binder and the sleeve.

8. The refractory article of claim 1, wherein the socket comprises a bottom wall comprising alumina, cordierite, mullite, a castable material, cement, fiber, or any combination thereof.

9. The refractory article of claim 1, wherein the socket comprises a side wall comprising metal, metal alloy, silicon carbide, or a combination thereof.

10. The refractory article of claim 1, wherein the particulate material comprises at least one of a ceramic, glass, polymer, metal, metal alloy, or a combination thereof.

11. The refractory article of claim 1, wherein the particulate material comprises a silicon carbide, alumina grains, mullite grains, or any combination thereof.

12. The refractory article of claim 1, wherein the binder comprises a refractory material.

13. The refractory article of claim 12, wherein the refractory material comprises alumina.

14. The refractory article of claim 1, wherein the collar, sleeve, or both comprise metal, metal alloy, silicon carbide, alumina, or a combination thereof.

15. A method forming a refractory article, comprising:
   disposing a particulate material within a cavity of a socket;
   placing a binder material overlying the particulate material and
   coupling a sleeve to the socket.

16. The method of claim 15, comprising fastening the sleeve to the socket.

17. The method of claim 16, comprising drying the binder material and bonding the sleeve to the socket.

18. The method of claim 15, comprising placing a collar overlying the socket.

19. The method of claim 18, comprising drying the binder material and bonding the collar to the socket.

20. The refractory article of claim 1, wherein the collar, sleeve, or both comprise an alloy including iron.

* * * * *